(12) United States Patent
Jauhar et al.

(10) Patent No.: US 11,556,776 B2
(45) Date of Patent: Jan. 17, 2023

(54) MINIMIZATION OF COMPUTATIONAL DEMANDS IN MODEL AGNOSTIC CROSS-LINGUAL TRANSFER WITH NEURAL TASK REPRESENTATIONS AS WEAK SUPERVISION

(71) Applicant: Microsoft Technology Licensing, LLC, Redmond, WA (US)

(72) Inventors: Sujay Kumar Jauhar, Kirkland, WA (US); Michael Gamon, Seattle, WA (US); Patrick Pantel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1066 days.

(21) Appl. No.: 16/164,366

(22) Filed: Oct. 18, 2018

(65) Prior Publication Data
US 2020/0125944 A1    Apr. 23, 2020

(51) Int. Cl.
*G06N 3/08* (2006.01)
*G06N 3/04* (2006.01)
*G06F 40/40* (2020.01)
*G06F 40/30* (2020.01)

(52) U.S. Cl.
CPC .............. *G06N 3/08* (2013.01); *G06F 40/30* (2020.01); *G06F 40/40* (2020.01); *G06N 3/04* (2013.01)

(58) Field of Classification Search
CPC .. G06N 3/04; G06N 3/08; G06F 40/30; G06F 40/40
See application file for complete search history.

(56) References Cited

U.S. PATENT DOCUMENTS 9,460,711 B1 * 10/2016 Vanhoucke ............. G10L 15/16
10,720,151 B2 * 7/2020 Sypniewski ......... G06K 9/6271
2017/0109355 A1 * 4/2017 Li .......................... G06N 5/022

OTHER PUBLICATIONS

Alexis Conneau, Guillaume Lample, Ruty Rinott, Adina Williams, Samuel R. Bowman, Holger Schwenk, Veselin Stoyanov, "XNLI: Evaluating Cross-lingual Sentence Representations", Sep. 13, 2018 (Year: 2018).*
Blitzer, et al., "Domain Adaptation with Structural Correspondence Learning", In Proceedings of the Conference on Empirical Methods in Natural Language Processing, Jul. 22, 2006, pp. 120-128.
Cho, et al., "Learning Phrase Representations using RNN Encoder-Decoder for Statistical Machine Translation", In Proceedings of the Conference on Empirical Methods in Natural Language Processing, Oct. 25, 2014, pp. 1724-1734.

(Continued)

*Primary Examiner* — Kamran Afshar
*Assistant Examiner* — Brian J Hales
(74) *Attorney, Agent, or Firm* — Calfee, Halter & Griswold LLP

(57) ABSTRACT

A task agnostic framework for neural model transfer from a first language to a second language, that can minimize computational and monetary costs by accurately forming predictions in a model of the second language by relying on only a labeled data set in the first language, a parallel data set between both languages, a labeled loss function, and an unlabeled loss function. The models may be trained jointly or in a two-stage process.

20 Claims, 5 Drawing Sheets

(56) References Cited

OTHER PUBLICATIONS

Das, et al., "Unsupervised Part-of-Speech Tagging with Bilingual Graph-Based Projections", In Proceedings of the 49th Annual Meeting of the Association for Computational Linguistics: Human Language Technologies—vol. 1, Jun. 19, 2011, pp. 600-609.
Daume III, Hal, "Frustratingly Easy Domain Adaptation", In Proceedings of the 45th Annual Meeting of the Association of Computational Linguistics, Jul. 2009, pp. 256-263.
Faruqui, et al., "Improving Vector Space Word Representations using Multilingual Correlation", In Proceedings of the 14th Conference of the European Chapter of the Association for Computational Linguistics, Apr. 26, 2014, pp. 462-471.
Ganin, et al., "Unsupervised Domain Adaptation by Backpropagation", In Journal of Computing Research Repository, Sep. 26, 2014, 11 Pages.
Glorot, et al., "Domain Adaptation for Large-scale Sentiment Classification: A Deep Learning Approach", In Proceedings of the 28th International Conference on Machine Learning, Jun. 28, 2011, 8 Pages.
Gouws, et al., "Bilbowa: Fast Bilingual Distributed Representations without Word Alignments", In Proceedings of the 32nd International Conference on Machine Learning, Jun. 1, 2015, 9 Pages.
Hassan, et al., "Achieving Human Parity on Automatic Chinese to English News Translation", In Journal of Computing Research Repository, Mar. 2018, 25 Pages.
Hu, et al., "Mnemonic Reader for Machine Comprehension", In Journal of Computing Research Repository, May 8, 2017, 10 Pages.
Huang, et al., "Cross-Language Knowledge Transfer using Multilingual Deep Neural Network With Shared Hidden Layers", In Proceedings of the IEEE International Conference on Acoustics, Speech and Signal Processing, May 26, 2013, pp. 7304-7308.
Jauhar, et al., "Neural Task Representations as Weak Supervision for Model Agnostic Cross-Lingual Transfer", In Repository of arXiv:1811.01115, Nov. 2, 2018, 9 Pages.
Klementiev, et al., "Inducing Crosslingual Distributed Representations of Words", In Proceedings of COLING 2012: Technical Papers, Dec. 2012, pp. 1459-1473.
Koehn, Philipp, "Europarl: A Parallel Corpus for Statistical Machine Translation", In Proceedings of Conference of the tenth Machine Translation Summit, Sep. 12, 2005, pp. 79-86.
Lee, Dong-Hyun, et al., "Pseudo-label: The Simple and Efficient Semi-supervised Learning Method for Deep Neural Networks", In Proceedings of Workshop on Challenges in Representation Learning, vol. 3, Jun. 18, 2013, 6 Pages.
Long, et al., "Learning Multiple Tasks with Deep Relationship Networks", In Repository of arXiv:1506.02117v1, Jun. 6, 2015, 9 Pages.
Long, et al., "Learning Multiple Tasks with Multilinear Relationship Network", In Proceedings of the 31st International Conference on Neural Information Processing Systems, Dec. 2017, 10 Pages.
Long, et al., "Learning Transferable Features with Deep Adaptation Networks", In Proceedings of the 32nd International Conference on International Conference on Machine Learning—vol. 37, Jul. 6, 2015, 9 Pages.
Luong, et al., "Bilingual Word Representations with Monolingual Quality in Mind", In Proceedings of the 1st Workshop on Vector Space Modeling for Natural Language Processing, May 31, 2015, pp. 151-159.
Mihalcea, et al., "Learning Multilingual Subjective Language via Cross-lingual Projections", In Proceedings of the 45th Annual Meeting of the Association of Computational Linguistics, Jun. 2007, pp. 976-983.
Mikolov, et al., "Efficient Estimation of Word Representations in Vector Space", In Journal of the Computing Research Repository, Jan. 2013, 12 Pages.
Misra, et al., "Cross-stitch Networks for Multi-task Learning", In Proceedings of the IEEE Conference on Computer Vision and Pattern Recognition, Jun. 27, 2016, pp. 3994-4003.
Mou, et al., "How Transferable are Neural Networks in NLP Applications?", In Journal of Computing Research Repository, Mar. 2016, 11 Pages.
Pado, et al., "Crosslingual Annotation Projection for Semantic Roles", In Journal of Artificial Intelligence Research, vol. 36, Nov. 17, 2009, pp. 307-340.
Zhou, et al., "Cross-lingual Sentiment Classification with Bilingual Document Representation Learning", In Proceedings of the 54th Annual Meeting of the Association for Computational Linguistics, vol. 1, Aug. 7, 2016, pp. 1403-1412.
"International Search Report and Written Opinion Issued in PCT Application No. PCT/US2019/055753", dated Feb. 4, 2020, 12 Pages.
Pham, et al., "Learning Distributed Representations for Multilingual Text Sequences", In Proceedings of the First Workshop on Vector Space Modeling for Natural Language Processing, May 31, 2015, pp. 88-94.
Prettenhofer, et al., "Cross Language Text Classification using Structural Correspondence Learning", In Proceedings of the 48th Annual Meeting of the Association for Computational Linguistics, Jul. 11, 2010, pp. 1118-1127.
Pryzant, et al., "JESC: Japanese-English Subtitle Corpus", In Journal of Computing Research Repository, Oct. 2017, 5 Pages.
Riloff, et al., "Learning Dictionaries for Information Extraction by Multi-level Bootstrapping", In Proceedings of the Sixteenth National Conference on Artificial Intelligence and the Eleventh Innovative Applications of Artificial Intelligence Conference Innovative Applications of Artificial Intelligence, Jul. 1999, 6 Pages.
Shi, et al., "Cross Language Text Classification by Model Translation and Semi-Supervised Learning", In Proceedings of the Conference on Empirical Methods in Natural Language Processing, Oct. 9, 2010, pp. 1057-1067.
Shi, et al., "Learning Cross-lingual Word Embeddings via Matrix Co-factorization", In Proceedings of the 53rd Annual Meeting of the Association for Computational Linguistics and the 7th International Joint Conference on Natural Language Processing, vol. 2, Jul. 26, 2015, pp. 567-572.
Srivastava, et al., "Dropout: A Simple Way to Prevent Neural Networks from Overfitting", In Journal of Machine Learning Research, vol. 15, Issue 1, Jun. 2014, pp. 1929-1958.
Upadhyay, et al., "Cross-lingual Models of Word Embeddings: An Empirical Comparison", In Proceedings of the 54th Annual Meeting of the Association for Computational Linguistics, Apr. 2016, 11 Pages.
Wan, Xiaojun, "Co-training for Cross-lingual Sentiment Classification", In Proceedings of the Joint Conference of the 47th Annual Meeting of the ACL and the 4th International Joint Conference on Natural Language Processing of the AFNLP: vol. 1-vol. 1, Aug. 2, 2009, pp. 235-243.
Xiao, et al., "Semi-supervised Matrix Completion for Cross-lingual Text Classification", In Proceedings of the Twenty-Eighth AAAI Conference on Artificial Intelligence, Jul. 27, 2014, pp. 1607-1613.
Xiong, et al., "Achieving Human Parity in Conversational Speech Recognition", In Journal of Computing Research Repository, Oct. 2016, 13 Pages.
Yang, et al., "Hierarchical Attention Networks for Document Classification", In Proceedings of the Conference of the North American Chapter of the Association for Computational Linguistics: Human Language Technologies, Jun. 12, 2016, pp. 1480-1489.
Yang, et al., "Trace Norm Regularised Deep Multi-task Learning", In Journal of Computing Research Repository, Jun. 2016, 5 Pages.
Yosinski, et al., "How Transferable are Features in Deep Neural Networks?", In Journal of Advances in Neural Information Processing Systems, Dec. 8, 2014, 14 Pages.
Zhang, et al., "Facial Landmark Detection by Deep Multi-task Learning", In Proceedings of European Conference on Computer Vision, Sep. 6, 2014, pp. 1-15.
Zhou, et al., "Attention-based LSTM Network for Cross-lingual Sentiment Classification", In Proceedings of the 2016 Conference on Empirical Methods in Natural Language Processing, Nov. 1, 2016, pp. 247-256.

(56) References Cited

OTHER PUBLICATIONS

Pan, et al., "Cross-Lingual Sentiment Classification via Bi-View Non-Negative Matrix Tri-Factorization", In Proceedings of Pacific-Asia Conference on Knowledge Discovery and Data Mining, May 24, 2011, pp. 289-300.

* cited by examiner

MINIMIZATION OF COMPUTATIONAL DEMANDS IN MODEL AGNOSTIC CROSS-LINGUAL TRANSFER WITH NEURAL TASK REPRESENTATIONS AS WEAK SUPERVISION

BACKGROUND

Field of the Subject Technology

The subject technology relates generally to transferring a neural model from one language to a neural model in a second language. More specifically, the subject technology relates to transferring a neural model from one language to a neural model in a second language with representation projection as weak supervision.

Related Art

Currently natural language processing is heavily Anglo-centric, while the demand for models that work in languages other than English is greater than ever. Yet, the task of transferring a model from one language to another can be expensive: in terms of factors such as annotation costs, engineering time, and effort.

Current research in Natural Language Processing (NLP) and Deep Learning has yielded systems that can achieve human parity in several key research areas such as speech recognition and machine translation. That is, these systems perform at or above the same level as humans. However, much of this research revolves around models, methods, and datasets that are Anglo-centric.

It is estimated that only about 350 million people are native English speakers, while another 500 million to 1 billion speak it as a second language. This accounts for at most 20% of the world's population. With language technologies making inroads into the digital lives of people, what is needed are NLP applications that can understand the other 80% of the world. However, building such systems from scratch can be expensive, time-consuming, and technically challenging.

SUMMARY

According to one aspect of the present technology, a method for cross-lingual neural model transfer may include training a first neural model of a first language having a plurality of layers on annotated data of the first language based on a labeled loss function, where the training of the first neural model includes defining and updating parameters of each of the layers of the first neural model; and training a second neural model of a second language having a plurality of layers on parallel data between the first language and the second language based on an unlabeled loss function, wherein the training of the second neural model includes copying all but the lowest level layer of the first neural model and defining and updating parameters of the lowest level layer of the second neural model.

The training may be a 2-stage training process, where the first model is completely trained prior to the training of the second model, or alternatively both the first model and the second model may be jointly trained after an initial training of the first model in a joint training process.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE FIGURES (NON-LIMITING EMBODIMENTS OF THE DISCLOSURE)

Non-limiting and non-exhaustive examples are described with reference to the following Figures.

DETAILED DESCRIPTION OF THE PREFERRED EMBODIMENTS

Figure 1:
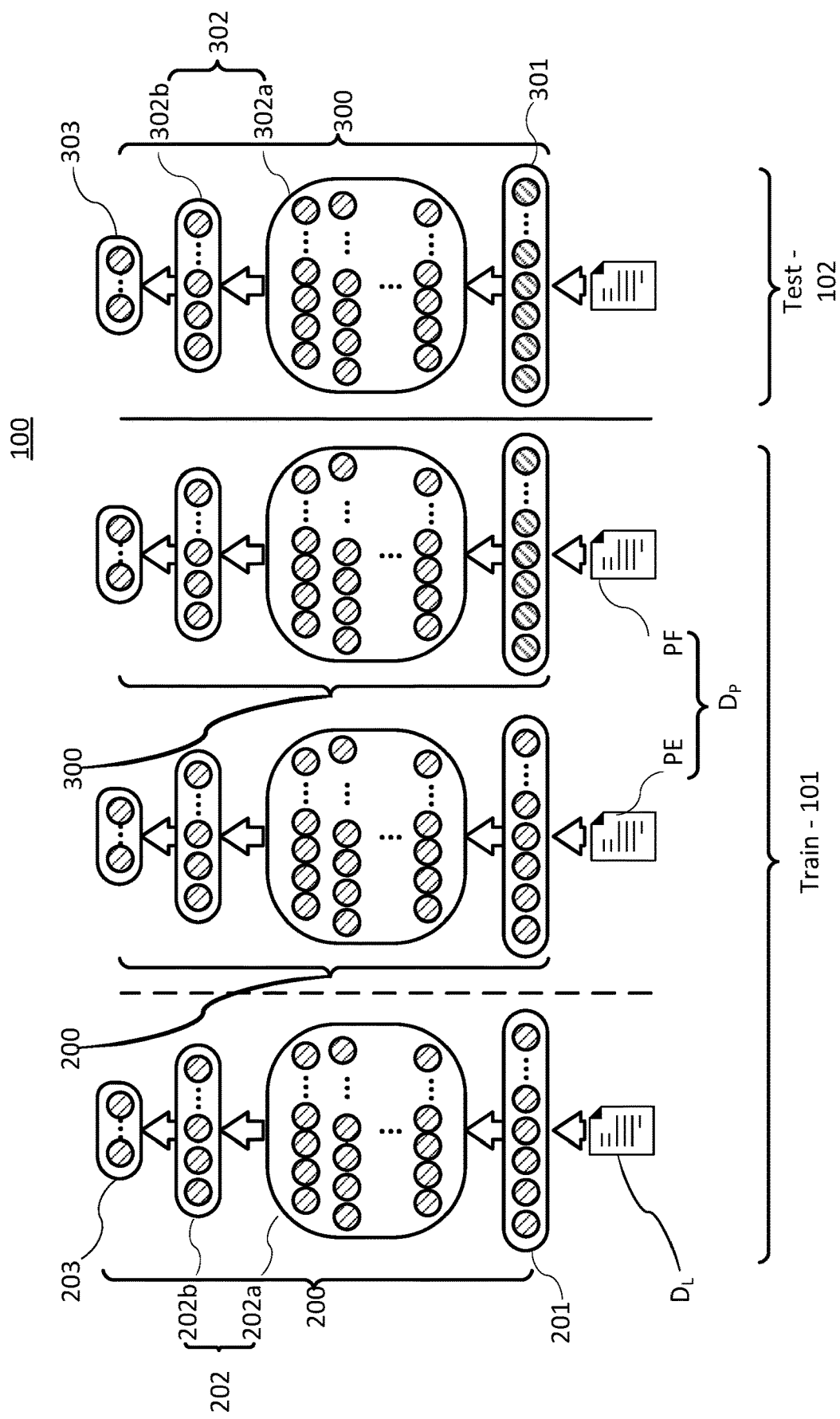
FIG. 1 illustrates a framework for cross-lingual neural model transfer according to an embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

One reason that building NLP systems from scratch is expensive, time consuming, and technically challenging is that performant NLP models often rely on vast amounts of high quality annotated data, which comes at the cost of annotator time, effort, and money. Annotated data is some language artifact (e.g., any text) that is annotated with some additional artifact. For example, a text may be reviewed for a criterion and a label or annotation may be added to the text based on that criterion. By way of example, the criterion may be sentiment, and the label or annotation may include positive sentiment or negative sentiment.

Other exemplary criteria include style classification, where the label may include whether the artifact is formal or informal; intent understanding, where the label may include prediction of intent of the artifact selected from a plurality of predetermined intents (e.g., scheduling an event, requesting information, or providing an update); message routing, where the label may include prediction of a primary recipient among a plurality of recipients; task duration, where the label may include prediction of the duration of an event; or structured content recognition, where the label may include prediction of a category of the artifact (e.g., sorting emails into categories such as flight itineraries, shipping notifications, or hotel reservations).

Given the great cost of building systems from scratch, much of the research community's efforts towards building tools for other languages have relied on transferring existing English models to other languages.

Previous efforts to transfer English models to other languages have relied on Machine Translation (MT) to translate training data or test data from English to a target language. Other efforts have additionally considered utilizing bilingual dictionaries to directly transfer features.

Building state-of-the-art MT systems requires expertise and vast amounts of training data, which is expensive. Meanwhile, bilingual dictionaries can be equally expensive to build if done manually, or contain significant noise if induced automatically.

Other research includes the study of the transferability of neural network components in the context of image recognition. This research illustrates a technical problem in the conventional art, i.e., that higher layers of the network tend to be more specialized and domain specific, and therefore less generalizable.

However, the technical solution according to embodiments of the present disclosure includes a framework for cross-lingual transfer that is the opposite: specifically, the higher layers of a network are shared between models of different languages while maintaining separate language specific embeddings (i.e., parameters of the lower layers of the network). By sharing the higher layers of the network, accurate models can be generated in a multitude of languages, without reliance on MT, bilingual dictionaries, or annotated data in the language of the model.

Sharing information across domains also pertains to Multi-Task Learning. Work in this area can be broadly separated into two approaches: hard parameter sharing and soft parameter sharing. In hard parameter sharing, models share a common architecture with some task-specific layers, while in soft parameter sharing, tasks have their own sets of parameters that are constrained by some shared penalty.

Prior research including label projection, feature projection, and weak supervision differs from embodiments of the present disclosure, which are drawn to a neural framework that integrates task featurization, model learning, and cross-lingual transfer in a joint schema, while also being flexible enough to accommodate a wide range of target applications.

In solving the technical problems faced by the conventional art, embodiments of a general framework of the present disclosure can easily and effectively transfer neural models from one language to other languages. The framework in one aspect relies on task representations as a form of weak supervision, and is model and task agnostic. In general, neural networks include a series of nodes arranged in layers including an input layer and a prediction layer. The portion of the neural network between the input layer and the prediction layer may include one or more layers that transform inputs into representations. Each layer after the input layer trains on the preceding layer, and therefore each layer increases in feature complexity and abstraction. Task representations capture an abstract depiction of a prediction problem, and are embodied as a layer in a neural network model preceding the prediction layer. By utilizing the disclosed framework, many existing neural architectures can be ported to other languages with minimal effort.

The only requirements for transferring a neural model according to embodiments of the present disclosure are parallel data and a loss defined over task representations.

A framework according to embodiments of the present disclosure can reduce both monetary and computational costs by forgoing reliance on machine translations or bilingual dictionaries, while accurately capturing semantically rich and meaningful representations across various languages. By eliminating any reliance on or interaction with a translation means, the framework can reduce the number of instructions handled by the processor, thereby increasing system speed, conserving memory, and reducing power consumption.

It is with respect to these and other general considerations that embodiments of the present disclosure are described below. Also, although relatively specific problems have been discussed, it should be understood that the embodiments should not be limited to solving the specific problems identified above.

Hereinbelow, a framework according to embodiments is described which can transfer an existing neural model of a first language to a second language with minimal cost and effort.

Specifically, the framework: (i) is model and task agnostic, and thus applicable to a wide range of new and existing neural architectures; (ii) needs only a parallel corpus and does not need target language training data, a translation system, or a bilingual dictionary; and (iii) has the sole modelling requirement of defining a loss over task representations, thereby greatly reducing the engineering effort, monetary costs, and computational costs involved in transferring a model from one language to another.

Embodiments are especially useful when a high quality MT system is not available for a target language or specialized domain. Conventionally, an MT system, bilingual dictionary, or a pivot lexicon are required to transfer a model from one language to another; however, according to embodiments, none of these is required to accurately predict outcomes at a rate that is on par, or even exceeds, conventional solutions.

A framework for transferring a neural model from a first language to a second language according to embodiments is described in greater detail. For the sake of example, embodiments are shown and described where the first language is English and the second language is French. Of course, the present technology is not limited hereto, and it should be understood that the only limitation of the first language and the second language is that they are not the same dialect of the same language.

FIG. 1 illustrates an exemplary framework 100 for transferring an English neural model 200 to a French neural model 300. As shown in FIG. 1, the framework includes a training portion or module 101 and a test portion or module 102. The framework of FIG. 1 depicts implementations of both joint and 2-stage training, which will be discussed in detail below.

The training portion 101 depicts both English neural model 200 and French neural model 300. As illustrated in FIG. 1, the training portion 101 depicts how the English neural model 200 is trained, and how the English neural model 200 is transferred to the French neural model 300. The training portion 101 of the framework 100 utilizes labeled English data $D_L$ and unlabeled parallel data $D_P$ including English parallel data PE and French parallel data PF.

Labeled data is data that has been supplemented with contextual information, typically directly by humans, and may also be referred to as annotated data.

So long as the parallel data is aligned between languages, it may be aligned at any level including character level, word level, sentence level, paragraph level, or otherwise.

Figure 2:
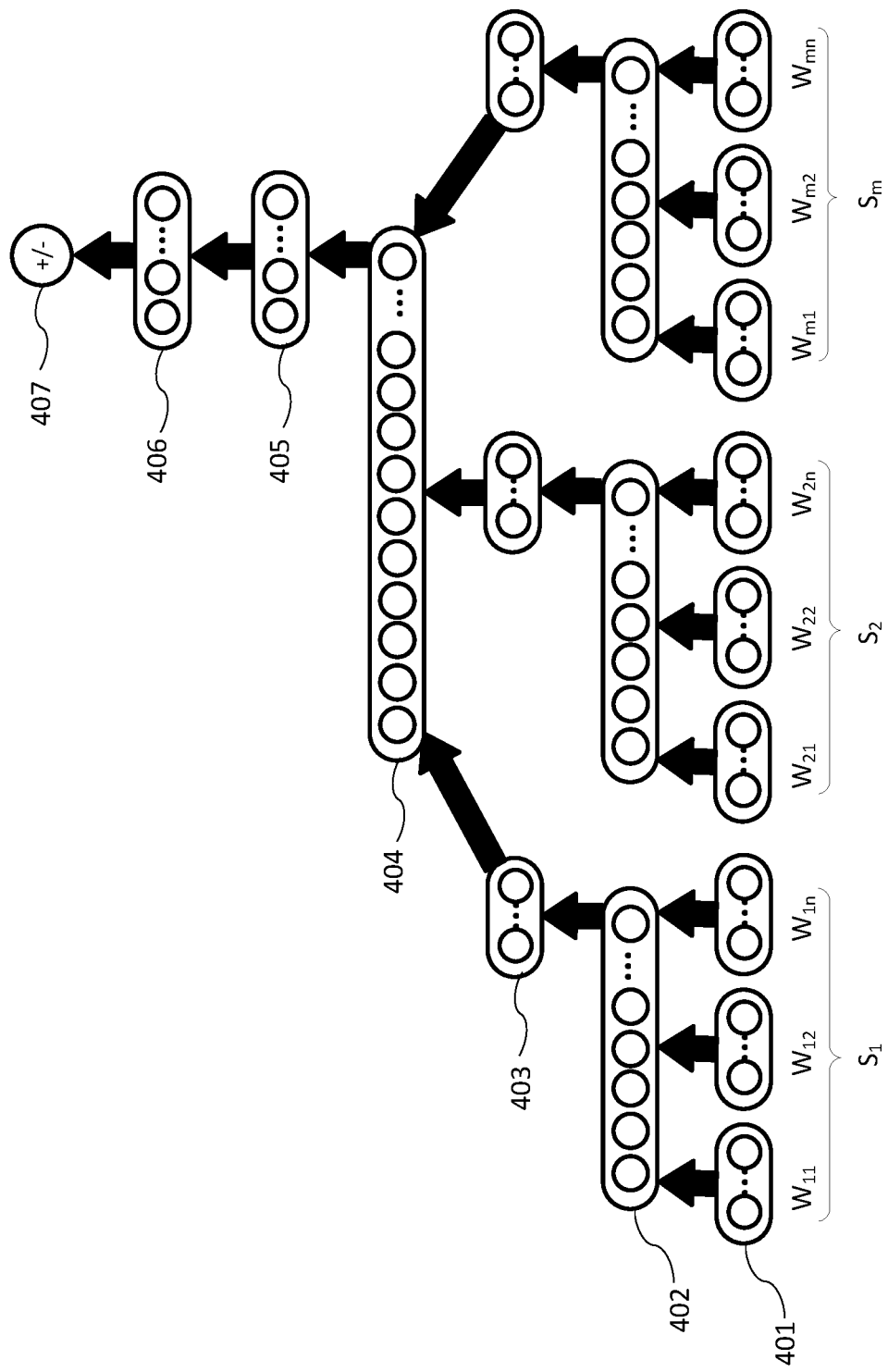
FIG. 2 illustrates a neural model architecture according to an embodiment.

According to an example embodiment as shown in FIGS. 1 and 2, labeled English data $D_L$ is provided to the English neural model 200.

The English neural model 200 may be a neural NLP model, and may include three distinct components: an embedding layer 201, a task-appropriate model architecture 202, and a prediction layer 203.

In more detail, the English neural NLP model 200 includes a first layer that is an embedding layer 201, which converts linguistic units w (characters, words, sentences, paragraphs, pseudo paragraphs, etc.) into mathematical representations of the linguistic units w. The mathematical representations may preferably be a dense representation of vectors that include mostly non-zero values, or alternatively a sparse representations of vectors that include many zero values.

The third layer is a prediction layer 203 used to produce a probability distribution over a space of output labels. According to an example embodiment, the prediction layer 203 may include a softmax function.

Between the prediction layer 203 and the embedding layer 201 is a task-appropriate model architecture 202.

As the framework 100 is both model and task agnostic, the structure of the task-appropriate model architecture 202 may include any number of layers and any number of parameters. That is, the task-appropriate model architecture 202 is what tailors the model to a particular task or application and the configuration of the network and number of layers does not affect the application of the general framework.

Therefore, for simplicity, the task-appropriate model architecture 202 is depicted as including an x-layer network 202a (where x is a non-zero integer number of layers) and a task representation layer 202b as the layer immediately preceding the prediction layer 203.

As shown in FIG. 1, the test portion 102 includes a French model 300, a French embedding layer 301, a task-appropriate model architecture 302, and a prediction layer 303. According to embodiments of the framework 100, the test portion 102 represents the utilization of the French model 300 to classify an unlabeled French data $D_F$. The task-appropriate model architecture 302 is depicted as including an x-layer network 302a (where x is a non-zero integer number of layers) and a task representation layer 302b as the layer immediately preceding the prediction layer 303.

FIG. 2 illustrates an example of a model architecture of neural models 200 and 300 according to an embodiment. Neural models 200 and 300 may be configured as a hierarchical Recurrent Neural Network (RNN) 400, though it should be understood that this is by way of example only and the architecture is not limited hereto.

As shown in FIG. 2, a data set is embedded into sequences of linguistic units $s_1$-$s_m$ ($w_{11}$-$w_{mn}$) by the embedding layer 401. The sequences of linguistic units $w_{11}$-$w_{mn}$ are converted into sentence representations 403 by a sentence RNN 402, and a sequence of sentence representations 403 are converted by a review-level RNN 404 into a task representation 405. The task representation 405 is then converted into a prediction layer 406 used to produce a probability distribution over a space of output labels 407. The number of output labels 407 is equal to the number of outcomes of the prediction task.

According to an embodiment, the RNN may comprise for example Gated Recurrent Units (GRUs). However it should be understood that the disclosure is not limited in this regard, and the RNN may also be a long short-term memory network (LSTM) or other network.

Model transfers according to embodiments rely on two features. First, the task-appropriate architecture and the prediction layer are shared across languages. Second, all of the information required to make a successful prediction is contained in the task representation layer.

As shown in FIG. 1, in a case where an English model 200 is transferred into a French model 300, the only difference between the English model 200 and the French model 300 is the language specific embeddings included in the embedding layers 201, 301 of the English model 200 and French model 300, respectively as illustrated by the contrasting cross-hatching of the embeddings. Second, the task representation layers 202b, 302b of the English model 200 and the French model 300 contain all the information required to make a successful prediction.

An indication of successful model transfer is that the French model and the English model predict the same thing when considering parallel data. That is, the content of the prediction is irrelevant, but rather the success of the model transfer is based on the sameness of the prediction of the French model and English model. The content of the prediction can be an actual label when the approach is label projection. Alternatively, representation projection can be utilized where the aim is to produce the same task representation in both languages. Representation projection is a softer form of weak supervision when compared to supervision based on label projection and is the preferred projection according to an embodiment.

To better illustrate a framework in accordance with embodiments, consider a task T and labeled data $D_L = \{x_i, y_i) | 0 \leq i \leq N\}$, where $x_i$ are English inputs, $y_i$ are outputs that take on K possible values such that each $x_i$ is annotated with a value $y_i$, and N is the number of linguistic units included in the labeled data $D_L$. Without loss of generality assume that the inputs $x_i = \{e_{i1}, \ldots, e_{ij}\}$ are sequences of English words. Moreover, a parallel data set $D_P = \{(e_j, f_j) | 0 \leq j \leq M\}$, where $e_j = \{e_{j1}, \ldots, e_{jl}\}$ and $f_j = \{f_{j1}, \ldots, f_{jl}\}$ are parallel English and French linguistic units respectively, and M is the number of linguistic unit pairs included in the parallel data $D_P$.

English embeddings included in the English embedding layer 201 may be denoted as $U = \{\vec{u}_l | \forall e_i \in V_E\}$, such that there is a vector $\vec{u}_l$ for every word in an English vocabulary $V_E$. The English vocabulary includes all words found in the inputs $x_i$. French embeddings included in the French embedding layer 301 may be denoted as $V = \{\vec{v}_l | \forall f_i \in V_F\}$, such that there is a vector $\vec{v}_l$ for every word in a French vocabulary $V_F$.

In the case of a shared model architecture, the dimensions d of vectors $\vec{u}_l$ and $\vec{v}_l$ must be the same. A mapping of the English sequence $e_j = \{e_{j1}, \ldots, e_{jm}\}$ to a sequence of vectors is denoted as $\vec{u}_j$ and a mapping of the French sequence $f_j = \{f_{j1}, \ldots, f_{jm}\}$ to a sequence of vectors is denoted as $\vec{v}_j$. An x-layer model 202b is denoted as μ with parameters $\theta_\mu$ that takes as input, a sequence of embeddings, and yields a task representation. Specifically, for an English input $x_i$, the task representation is denoted as:

$$R_{x_i}^T = \mu(\vec{u}_i; \theta_\mu) \qquad (1)$$

Finally, a prediction layer 203 is denoted as n with parameters $\theta_\pi$ that yields a probability distribution over the K output variables:

$$\widehat{\pi}_i^k = \frac{\pi_k(R_{x_i}^T; \theta_\pi)}{\sum_{j=1}^K \pi_j(R_{x_i}^T; \theta_\pi)}, \quad (2)$$

where $\pi_k$ is the $k^{th}$ neuron of the layer, and the shorthand $\widehat{\pi}_i^k$ is used to denote $P(\hat{y}_i=k)$. The framework according to an embodiment then optimizes two losses.

Labeled Loss:

Given that the model includes labeled English data $D_L$ as an input, the following loss is optimized for the combined network:

$$L_{D_L} = \sum_{i=1}^N \sum_{k=1}^K \Delta_L(\widehat{\pi}_i^k, y_i) \quad (3),$$

where $\Delta_L$ is a loss function defined between $\widehat{\pi}_i^k$ and the response variable $y_i$. For example, in a binary case $\Delta_L$ might be a cross-entropy loss, though it should be understood that this is by way of example only, and the framework is not limited thereto.

Unlabeled Loss:

The English task representations generated by the model are used as weak supervision on the parallel data for the French side. Specifically:

$$L_{D_P} = \sum_{j=1}^M \Delta_P(R_{e_j}^T, R_{f_j}^T) \quad (4),$$

where $\Delta_P$ is a loss function between task representations yielded on parallel inputs. Since task representations are vectors, the mean-squared error between them, for example, might be an appropriate loss, though the framework is not limited thereto.

Then jointly, the final optimization is given by $L=L_{D_L}+\alpha L_{D_P}$, where $\alpha$ is a hyperparameter that controls the mixing strength between the two loss components.

In contrast to conventional frameworks, in a framework in accordance with an embodiment there is no requirement for MT, since neither training nor test data is ever translated. Nor are any other resources, such as a pivot lexicon or bilingual dictionary, used. The only requirement is parallel data and the definition of a loss function $L_{D_P}$. The model architecture $\mu$ and the labeled loss $L_{D_L}$ are properties defined for an English only model.

With well-defined loss functions $\Delta_L$ and $\Delta_P$, training consists of back-propagating errors through the network and updating the parameters of the model.

Figure 3:
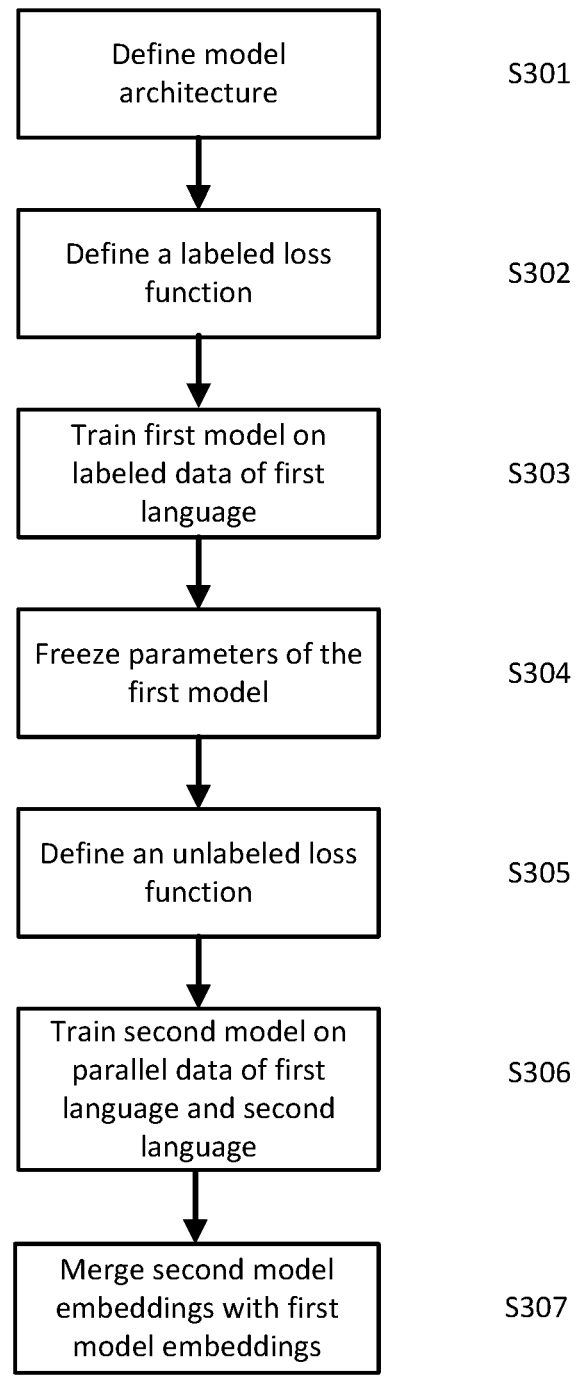
FIG. 3 illustrates a flowchart depicting a method for cross-lingual neural model transfer according to an embodiment.
Figure 4:
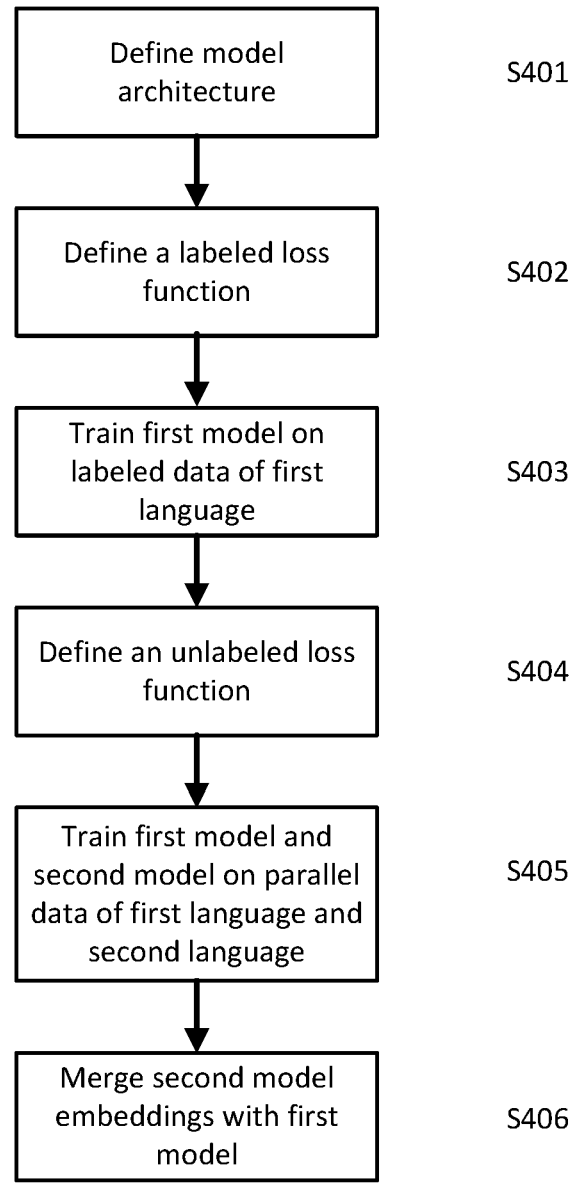
FIG. 4 illustrates a flowchart depicting a method for cross-lingual neural model transfer according to another embodiment.

FIGS. 3 and 4 illustrate two methods for transferring a neural model from a first language to a second language according to embodiments. In detail, FIG. 3 illustrates a 2-stage training method and FIG. 4 illustrates a joint training method.

As shown in FIG. 3, in two-stage training, a model architecture is defined in step S301. As the framework is model agnostic, the model may be defined as shown in FIG. 2, though it should be understood that the framework is not limited in this manner.

A labeled loss $L_{D_L}$ is defined in step S302, and the first model 200 is trained on the labeled data $D_L$ of the first language by finding U*, $$\theta_\mu^*, \theta_\pi^* = \arg\max_{U, \theta_\mu, \theta_\pi} L_{D_L}$$

in step S303. In this context "*" denotes an optimized value for the arg max function in step S303.

After training the first model 200, the embeddings U of the first model and the shared model parameters $\theta_\mu$ and $\theta_\pi$ are frozen in step S304.

An unlabeled loss $L_{D_P}$ is defined in step S305, and the unlabeled loss is trained on the parallel data $D_P$ by optimizing $$V^* = \arg\max_V L_{D_P}$$

in step S306. That is, in the second stage of the 2-stage training, only the second embeddings V of the second model are updated on the parallel data.

In step S307, the first embeddings U of the embedding layer 201 of the first model 200 are replaced with the second embeddings V of the embedding layer 301 of the second model 300. This combined model is the updated second model 300. Therefore, the updated second model 300 includes parameters V*, $\theta_\mu$, $\theta_\pi$.

As shown in FIG. 4, in joint training, a model architecture is defined in step S401. As the framework is model agnostic, the model may be defined as shown in FIG. 2, though it should be understood that the framework is not limited in this manner.

A labeled loss $L_{D_L}$ is defined in step S402, and the labeled loss is trained on the labeled data $D_L$ by finding U*, $$\theta_\mu^*, \theta_\pi^* = \arg\max_{U, \theta_\mu, \theta_\pi} L_{D_L}$$

in step S403.

An unlabeled loss $L_{D_P}$ is defined in step S404, and the unlabeled loss is trained on the parallel data $D_P$ in step S405 by optimizing U*, V*, $$\theta_\mu^*, \theta_\pi^* = \arg\max_{U, V, \theta_\mu, \theta_\pi}$$

L. L is a weighted combination of labeled loss and unlabeled loss and is given by $L=L_{D_L}+\alpha L_{D_P}$, where $\alpha$ is a hyperparameter that controls the mixing strength between the two loss components.

In joint training, when processing the parallel data $D_P$ parameters of both the first model 200 and the second model 300 are updated in step S404.

In step S406, the first embeddings U of the embedding layer 201 of the first model 200 are replaced with the second embeddings V of the embedding layer 301 of the second model 300. This combined model is the updated second model 300. Therefore, the updated second model 300 includes parameters V*, $\theta_\mu^*$, $\theta_\pi^*$.

Example Model Transfer: Sentiment Classification

To better illustrate a general framework according to an embodiment, in the following demonstrative example, a sentiment classifier is transferred from one language to another language.

In this example, the sentiment classifier predicts whether a language artifact is positive or negative. According to embodiments, the only necessary steps are to define the model architecture μ and the two loss functions $L_{D_L}$ and $L_{D_P}$.

Given the binary nature of the prediction task, the prediction layer may be given as a sigmoid layer with one output neuron that computes the probability of a positive label: $\widehat{\pi_i^\ddagger} = \sigma(\theta_\pi^T \cdot R_{x_i}^T)$. The labeled loss may be a cross-entropy loss:

$$L_{D_L} = -\Sigma_{i=1}^N (y_i \log \widehat{\pi_i^\ddagger} + (1-y_i)\log(1-\widehat{\pi_i^\ddagger})) \quad (5).$$

On the parallel side, the unlabeled loss may be a mean-squared error loss:

$$L_{D_P} = \sum_{j=1}^M \frac{1}{d^T} \sum_{i=1}^{d^T} (R_{e_j}^T(i) - R_{f_j}^T(i))^2, \quad (6)$$

where $d^T$ is the dimension of the task representation $R^T$, and $R^T(i)$ denotes its $i^{th}$ dimension.

While the above example defines loss functions for a binary system, it should be understood that other loss functions can be defined for other systems, and systems may have any number of possible outputs.

Cross-Lingual Word Association

So as to demonstrate task representation as weak supervision, Table 1 shows several sentiment bearing English words, and their nearest French neighbors (by vector cosine distance on their respective embeddings) in the joint model according to an embodiment.

TABLE 1

| EN Sentiment Term | Nearest FR Neighbors |
|---|---|
| excellent | honneur, essentiel, heureux, formidable, fantastique, m'amène, ravie, remarquable, bienvenue, heureuse |
| terrible | ridicule, gaspillage, désolé, déchets, déception, décevant, déçu, honte, désolée, pire |
| useful | complet, fonctionnera, civils, appropriée, utile, digne, utilité, pertinent, pertinents, requises |
| cheat | désole, mensonger, déchirer, insultant, erronés, déficitaire, floue, comprendrais, imprégné, incohérent |

It can be seen in Table 1 above that the positive (or negative) sentiment terms in English have definitions that are similar to the nearest neighbor positive (or negative) terms in French. While the nearest neighbor terms in French are not necessarily direct translations or even synonyms, the sentiment prediction task does not require translations; it is sufficient to identify words that echo the same sentiment. Thus, a framework for model transfer in accordance with embodiments is able to identify sentiment similarity across languages, without direct supervision and only using a weak fuzzy signal from representation projection.

Machine Translation Utilization

While the framework does not require MT, MT may be utilized according to an embodiment.

For example, training-time Translation (TrnT) may be utilized, which translates training data from a first language into another language, and then trains a sentiment model in that language. Test-time Translation (TstT) may be utilized, which trains a sentiment model in a first language and uses the trained sentiment model to classify language artifacts that are translated into the first language at test time.

Thus a framework according to an embodiment, while capable even without a translation engine, may optionally be used in combination with a translator.

Multi-Modal Model Transfer

The framework can be applied to multi-modal (instead of multi-lingual) transfer. That is, models may be transferred between different modes, including language, images, videos, audio clips, etc. For example, sentiment understanding may be transferred to images, without the need for explicit image annotations. In such a multi-modal transfer, annotated data may include labeled sentiment data in a first language. Parallel data may include images with captions in the first language. Once the framework is trained on the annotated and parallel data, the framework can predict the sentiment of images with no captions.

Figure 5:
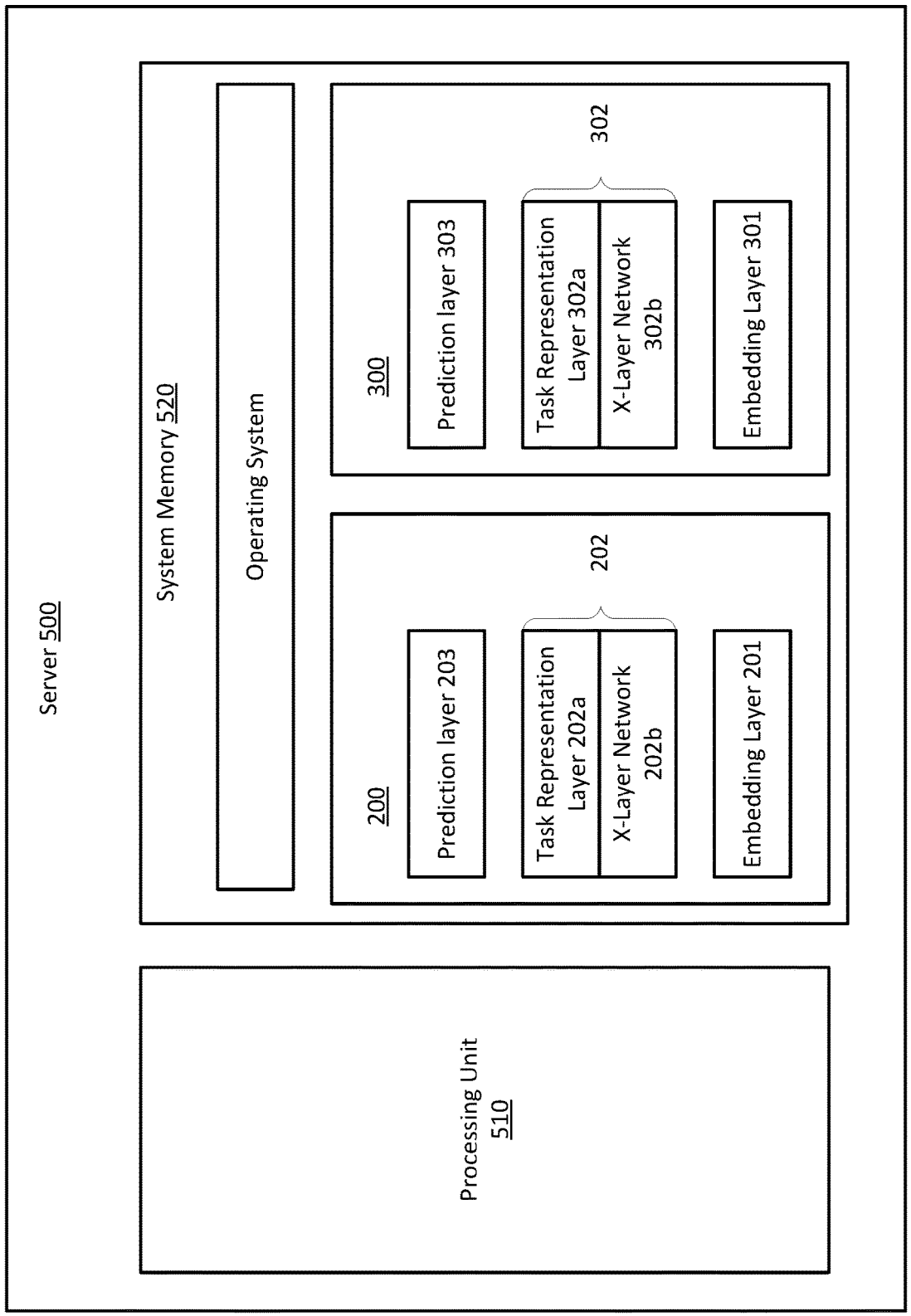
FIG. 5 illustrates an exemplary block diagram of a computer system in which embodiments may be implemented.

FIG. 5 illustrates a schematic of an example computer or processing system that may implement any of the systems, methods, and computer program products, such as the English neural model 200 and the French neural model 300, described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, a server 500, one or more processors or processing units 510, and a system memory 520. Processor 510 may include software modules that performs the methods described herein. The module may be programmed into the integrated circuits of processor 510, or loaded from memory 520, or network (not shown) or combinations thereof.

The computer system may include a variety of computer system readable media. Such media may be any available media that is accessible by the computer system, and it may include both volatile and non-volatile media, removable and non-removable media.

Volatile memory may include random access memory (RAM) and/or cache memory or others. Other removable/non-removable, volatile/non-volatile computer system storage media may include a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

As will be appreciated by one skilled in the art, aspects of the framework may be embodied as a system, method, or computer program product. Accordingly, aspects of the disclosed technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed technology may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed technology may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed technology are described with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which, when loaded in a computer system, is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the disclosed technology has been presented for purposes of illustration and description, but is not intended to be exhaustive or limiting. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments have been described, it will be understood by those of skill in the art that there are other embodiments that are equivalent to the described embodiments. Accordingly, it is to be understood that the disclosure is not to be limited by the specific illustrated embodiments, but only by the scope of the appended claims.

What is claimed is:

1. A system comprising:
   a processor and a memory, wherein the memory comprises instructions that, when executed by the processor, cause the processor to perform acts comprising
      training a first neural model on labeled data in a first language or dialect such that the first neural model, when trained, performs a classification task with respect to first text received in the first language or dialect, wherein training the first neural model comprises learning first parameters of a first embedding layer that receives the first text in the first language or dialect and converts the first text into a first embedding, wherein the first embedding layer is a lowest layer in the first neural model;
      training a second neural model based upon unlabeled data in a second language or dialect such that, when trained, the second neural model performs the classification task with respect to second text received in the second language or dialect, wherein training the second neural model comprises learning second parameters of a second embedding layer of the second neural network that receives the second text in the second language or dialect and converts the second text into a second embedding, wherein the second embedding layer is a lowest layer in the second neural model; and
      updating the first neural model by replacing the first embedding layer with the second embedding layer such that, when updated, the first neural model performs the classification task with respect to the second text received in the second language or dialect.

2. The system of claim 1, wherein the first embedding layer converts linguistic units of the first language or dialect into vector representations, and wherein the first neural model further comprises:
   a first task-appropriate model architecture having a predetermined network configuration including one or more layers; and
   a first prediction layer,
   wherein one of the one or more layers included in the first task-appropriate model architecture is a first task representation layer, and
   wherein the first task representation layer immediately precedes the first prediction layer.

3. The system of claim 2, wherein the
second embedding layer converts linguistic units of the second language or dialect into vector representations, and wherein the second neural model further comprises:
   a second task-appropriate model architecture having a predetermined network configuration including one or more layers; and
   a second prediction layer.

4. The system of claim 3, wherein a task of a task-appropriate model architecture includes one of sentiment classification, style classification, intent understanding, message routing, duration prediction, and structured content recognition.

5. The system of claim 1, wherein the second neural model is trained without annotated data of the second language or dialect.

6. The system of claim 1, wherein the second neural model is trained without a translation system, a dictionary, or a pivot lexicon.

7. The system of claim 1, wherein training resources consist of annotated data of the first language or dialect and unannotated parallel data in both the first language or dialect and the second language or dialect.

8. A method performed by a computing system, the method comprising:
- training a first neural model on labeled data in a first language or dialect such that the first neural model, when trained, performs a classification task with respect to first text received in the first language or dialect, wherein training the first neural model comprises learning first parameters of a first embedding layer that receives the first text in the first language or dialect and converts the first text into a first embedding, and further wherein the first embedding layer is a lowest layer in the first neural model;
- training a second neural model based upon unlabeled data in a second language or dialect such that, when trained, the second neural model performs the classification task with respect to second text received in the second language or dialect, wherein training the second neural model comprises learning second parameters of a second embedding layer of the second neural network that receives the second text in the second language or dialect and converts the second text into a second embedding, and further wherein the second embedding layer is a lowest layer in the second neural model; and
- updating the first neural model by replacing the first embedding layer with the second embedding layer such that, when updated, the first neural model performs the classification task with respect to the second text received in the second language or dialect.

9. The method of claim 8, wherein the first embedding layer converts linguistic units of the first language or dialect into vector representations, and wherein the first neural model further comprises:
- a first task-appropriate model architecture having a predetermined network configuration including one or more layers; and
- a first prediction layer,
- wherein one of the one or more layers included in the first task-appropriate model architecture is a first task representation layer, and
- wherein the first task representation layer immediately precedes the first prediction layer.

10. The method of claim 9, wherein the second embedding layer converts linguistic units of the second language or dialect into vector representations, and wherein the second neural model further comprises:
- a second task-appropriate model architecture having a predetermined network configuration including one or more layers; and
- a second prediction layer.

11. The method of claim 10, wherein a task of a task-appropriate model architecture includes one of sentiment classification, style classification, intent understanding, message routing, duration prediction, and structured content recognition.

12. The method of claim 8, wherein the second neural model is trained without annotated data of the second language or dialect.

13. The method of claim 8, wherein the second neural model is trained without a translation system, a dictionary, or a pivot lexicon.

14. The method of claim 8, wherein training resources consist of annotated data of the first language or dialect and unannotated parallel data in both the first language or dialect and the second language or dialect.

15. A non-transitory computer-readable medium comprising instructions that, when executed by a processor, cause the processor to perform acts comprising:
- training a first neural model on labeled data in a first language or dialect such that the first neural model, when trained, performs a classification task with respect to first text received in the first language or dialect, wherein training the first neural model comprises learning first parameters of a first embedding layer that receives the first text in the first language or dialect and converts the first text into a first embedding, and further wherein the first embedding layer is a lowest layer in the first neural model;
- training a second neural model based upon unlabeled data in a second language or dialect such that, when trained, the second neural model performs the classification task with respect to second text received in the second language or dialect, wherein training the second neural model comprises learning second parameters of a second embedding layer of the second neural network that receives the second text in the second language or dialect and converts the second text into a second embedding, and further wherein the second embedding layer is a lowest layer in the second neural model; and
- updating the first neural model by replacing the first embedding layer with the second embedding layer such that, when updated, the first neural model performs the classification task with respect to the second text received in the second language or dialect.

16. The non-transitory computer-readable medium of claim 15, wherein the first embedding layer converts linguistic units of the first language or dialect into vector representations, and wherein the first neural model further comprises:
- a first task-appropriate model architecture having a predetermined network configuration including one or more layers; and
- a first prediction layer,
- wherein one of the one or more layers included in the first task-appropriate model architecture is a first task representation layer, and
- wherein the first task representation layer immediately precedes the first prediction layer.

17. The non-transitory computer-readable medium of claim 16, wherein the second embedding layer converts linguistic units of the second language or dialect into vector representations, and wherein the second neural model further comprises:
- a second task-appropriate model architecture having a predetermined network configuration including one or more layers; and
- a second prediction layer.

18. The non-transitory computer-readable medium of claim 17, wherein a task of a task-appropriate model architecture includes one of sentiment classification, style classification, intent understanding, message routing, duration prediction, and structured content recognition.

19. The non-transitory computer-readable medium of claim 15, wherein the second neural model is trained without annotated data of the second language or dialect.

20. The non-transitory computer-readable medium of claim 15, wherein the second neural model is trained without a translation system, a dictionary, or a pivot lexicon.

* * * * *